July 13, 1965 J. D. HAMAKER 3,194,618
ANTI-FRICTION BEARINGS
Filed May 27, 1963 2 Sheets-Sheet 1

INVENTOR
John D. Hamaker
BY Ashley & Ashley
ATTORNEYS

July 13, 1965 J. D. HAMAKER 3,194,618
ANTI-FRICTION BEARINGS
Filed May 27, 1963 2 Sheets-Sheet 2
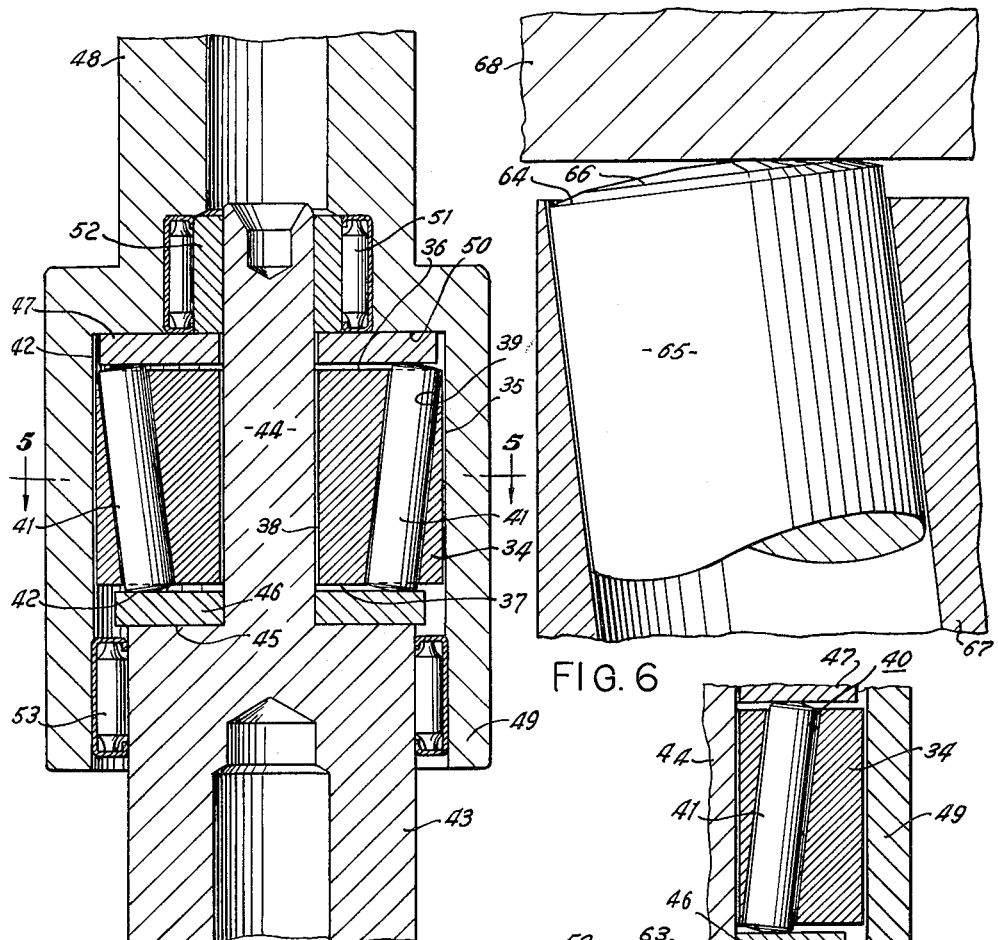
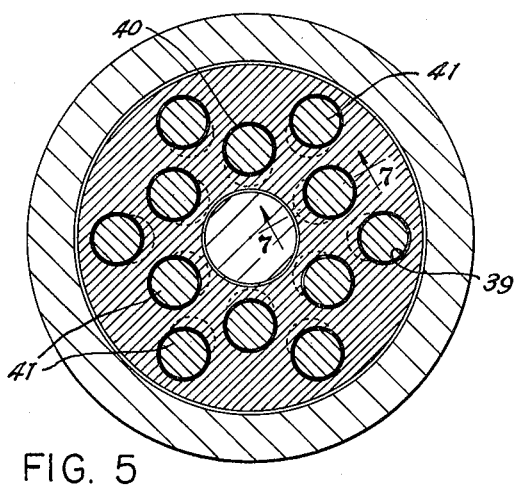
INVENTOR
John D. Hamaker
BY Ashley & Ashley
ATTORNEYS 3,194,618
ANTI-FRICTION BEARINGS
John D. Hamaker, Rte. 7, Box 276, Tyler, Tex.
Filed May 27, 1963, Ser. No. 283,256
14 Claims. (Cl. 308—231)

This invention relates to new and useful improvements in anti-friction bearings.

The invention is directed in particular to a bearing of high load capacity functioning equivalently to conventional ball bearing in which the bearing balls are of quite large radius or diameter, but in which the overall dimensions of the bearing are drastically reduced either longitudinally or radially as the occasion may require.

A principal object of the invention is to provide an improved anti-friction bearing wherein a plurality of bearing members are carried in a cage member, the bearing members, and consequently, the cage member, being relatively thin or narrow in one dimension for conservation of space but having convex or spherical end faces receiving the bearing and struck on a radius of curvature much greater than the transverse dimensions of the bearing members so as to provide the equivalent static capacity at point of contact of a conventional ball bearing having bearing balls of considerable diameter but without having the space requirements of such a bearing.

A further object of the invention is to provide an improved anti-friction bearing of the character described in the convex bearing faces have concentric frusto-conical portions for distributing the bearing load over a larger area.

An additional object of the invention is to provide an improved anti-friction bearing in which the points of support of the bearing loads upon the end faces of the bearing members are restricted to peripheral areas for controlled end wear of the bearing members.

Still another object of the invention is to provide an improved anti-friction bearing of the character described in which the bearing members are arranged in one or more concentric annuli in the cage member, and may be inclined in any suitable or desirable degree and direction.

Other and more particular objects will be apparent from a reading of the following description.

A construction designed to carry out the invention will be hereinafter described, together with other features of the invention.

Figure 1:
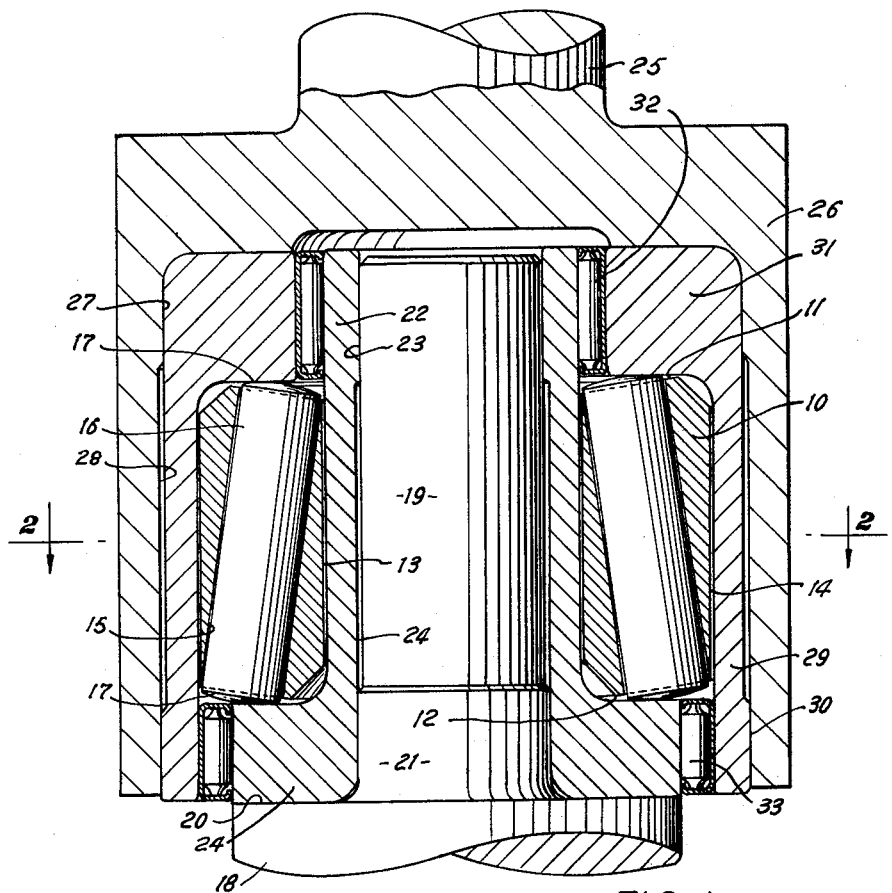
Figure 2:
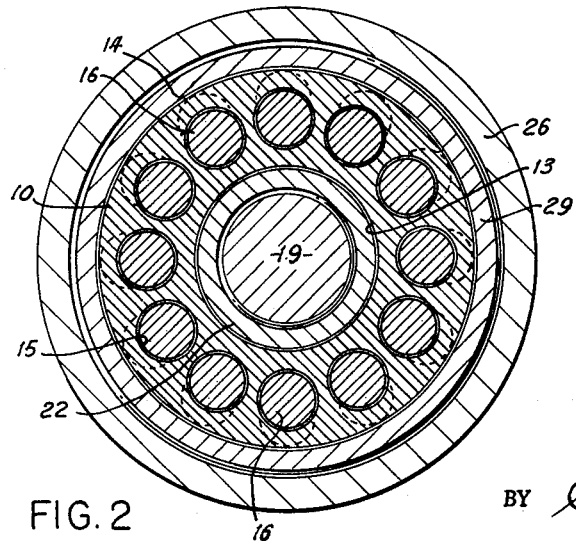
Figure 3:
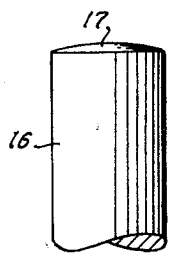

The invention will be more readily understood from a reading of the following specification and by reference to the accompanying drawings, wherein examples of the invention are shown, and wherein:

FIG. 1 is a view, partly in elevation and partly in section, illustrating an anti-friction bearing constructed in accordance with this invention, FIG. 2 is a reduced, cross-sectional view taken upon the line 2—2 of FIG. 1, FIG. 3 is a fragmentary side elevation showing the end portion of one of the bearing members, FIG. 4 is a longitudinal, sectional view of a modified form of the anti-friction bearing, FIG. 5 is a cross-sectional view taken upon the line 5—5 of FIG. 4, FIG. 6 is an enlarged, fragmentary, sectional view illustrating a modified form of the end bearing faces of the bearing members, FIG. 7 is a fragmentary, cross-sectional view taken upon the line 7—7 of FIG. 5, and FIG. 8 is a view similar to FIG. 7 illustrating an alternate inclination of the bearing members and an alternate configuration for the end bearing faces thereof.

In the drawings, the numeral 10 designates an annular or a generally ring-shaped cage member having an upper end face 11, a lower end face 12 and having an axial bore 13 forming an interior face. The cage member also has an outer longitudinal face 14 and is formed with a plurality of longitudinal bores or bearing bores 15 opening through the upper face 11 and the lower face 12 and disposed at an oblique angle with respect to the longitudinal axis of the cage member, in the particular embodiment shown, the bores 15 being inclined radially inwardly at their upper ends toward the bore 13. The bearing bores 15 are equidistantly spaced circumferentially of the cage member around the axial bore 13, and although equidistant spacing is highly desirable, it is not to be considered essential.

Each of the bearing bores 15 receives an elongate bearing member 16, again in the particular embodiment illustrated, the bearings 16 being cylindrical in configuration, but in any event, the end portions of the bearing members 16 must be circular and the bearing members must be rotatable within the bores 15. Each of the bearing members 16 have convex or spherical upper and lower bearing end faces 17 having a radius of curvature much greater than the radius of the bearing members 16 themselves, and for optimum performance, the radii of curvature of the end faces 17 should be one-half the over-all length of the bearing member 16 so that the bearing member, in essence, constitutes a cylindrical core taken through the center of a relatively large sphere. The bearing members 16 are rotatable in the bores 15, but are very closely fitted thereto so as to have a minimum of lateral clearance and play or movement.

The bearing members 16 have axial lengths greater than the bearing bores in which they are received and may have lengths greater or less than twice the radii of curvature of the end faces 17, but as this optimum dimension is varied, greater or lesser lateral forces upon the bearing members 16 will come into existence tending to tilt the bearing members in the bearing bores 15 and resulting in additional friction and wear between the bearing members and the bearing bores. The angle of inclination of the bearing members and the bearing bores may be varied somewhat, it usually being desirable to maintain the angularity of the order of magnitude of a few degrees up to 8° or 10° or more, and it is preferable that the line extending between the contact or bearing points on the faces 17 intersect the longitudinal center of the bearing members 16 at the transverse center thereof and be parallel to the longitudinal axis of the bearing cage. In this way, a true, rolling-action anti-friction bearing is produced. Of course, the bearing members 16, along with the cage member 10 may be heat-treated, hardened, plated, and otherwise conventionally treated as may be found suitable or desirable.

The bearing structure is adaptable not only for use as an axial thrust bearing as illustrated in the drawings to withstand thrusts delivered axially along a shaft or other rotating member, but may also be used for withstanding radial thrusts simply by constructing the cage member 10 of suitable radial dimensions and with more or less radially directed bearing bores so as to provide a relatively wide but very flat bearing having a performance equivalent to that of a comparable ball bearing which, of course, would have a much larger axial thickness. Further, the bearing members 16 may be inclined inwardly as shown or outwardly, as may be desired, alternate ones of the bearing members may be inclined inwardly while the remaining are inclined outwardly, or selected ones of the bearing members may be inclined in either direction as may be desired, it being important that the relative angles of inclination be kept equal and opposite, it also being desirable that the distribution of the inwardly and outwardly inclined bearing members, if such arrangement is utilized, be symmetrical about the axis of the cage member 10. In many cases, an alternation or judicious balancing of inward and outward inclinations may avoid undesirable longitudinal thrusts upon the bearing cage.

The bearing members 16, are, of course, of greater axial length than the axial lengths of the bearing bores 15 so as to project beyond the end faces thereof, as illustrated, and many different arrangements may be employed for receiving from or transmitting to the end faces 17 of the bearing members, the thrusts and loads to be withstood. In the form of the invention shown in FIG. 1, a shaft 18 is formed with an axial pin 19 forming a shoulder 20 and a circumferential seating face 21 upon the pin 19 adjacent the shoulder 20. The pin 19 is received in a collar 22 having an axial seating bore 23 at its upper end adjoined by a counterbore 24 in which the face 21 seats, and carrying at its lower end an outwardly extending annular flange 24 against the lower side of which the shoulder 20 abuts. Desirably, the face 21 has a press fit in the counterbore 24, and the upper end of the pin 19 has a press fit in the seating face or bore 23 so that the collar 19 revolves with the shaft 18.

The axial bore 13 of the cage member 10 has a sliding fit over the outer surface of the pin 19, the lower end faces 17 of the bearing members 16 engaging the upper surface of the shoulder 24. A second shaft or support member 25 carries a cylindrical box 26 with a seating face 27 formed at the upper end of its interior and adjoined by a downwardly extending counterbore 28. A second collar 29 has an external seating face 30 at its lower end for a press fit in the lower end of the box 26, its upper exterior portion being reduced in diameter for a press fit with relation to the seating face 27. An inwardly extending annular flange 31 is provided at the upper end of the collar 29, its upper surface abutting the bottom of the box 26, while its lower surface adjoins the upper end bearing faces 17 of the bearing members 16. Suitable needle or pin bearings 32 and 33 are provided between the upper end of the collar 22 and the inner face of the flange 31, and between the lower interior end of the box 26 and the outer face of the flange 24, respectively.

With this arrangement, endwise relative thrusts between the shafts or members 18 and 25 are transferred to the flanges 24 and 31, and thence to the end bearing faces 17 of the bearing members 16. The bearing faces, having radii of curvature very much greater than the transverse dimensions of the members 16, and the members 16 being freely rotatable or revolvable in the bearing bores 15, a true rolling-action function the same as achieved by spherical ball bearings having a diameter equal to the axial length of the members 16 is obtained, and the bearing withstands the same bearing loads without requiring such large transverse dimensions or radial dimensions as are required by conventional ball bearings. Indeed, the only limit upon the loads to which the bearing members 16 may be subjected are those loads that the members are capable of withstanding in columnar stress. In general, the more nearly the inclination of the bearing members 16 approaches the vertical or parallel to the longitudinal axis of the cage member 10, the greater the loads which may be withstood without excessive heating of the bearing; whereas the greater the angularity of the bearing members and the nearer the point of thrust application approaches the peripheries of the end faces 17, the greater the speeds at which the bearing may be utilized without overheating, this being due to the fact that the more nearly the bearing point approaches the peripheries of the end faces 17, the slower the bearing members 16 revolve within the bores 15 in relation to the relative speed of rotation between the members 18 and 25. In this thrust application of the anti-friction bearing, the bearing members 16 achieve a true rolling action and there is no relative slippage between the end faces 17 and the flanges 24 and 31. In the utilization of the bearing structure for withstanding radial thrusts, however, there will be different speeds of movement of the surfaces engaging the end faces 17 as between the opposite ends of the members 16, and accordingly some slippage must necessarily occur.

A modified form of the anti-friction bearing is shown in FIG. 4 of the drawings and includes an annular or generally ring-like cage member 34 having an outer longitudinal face 35 and upper and lower end faces 36 and 37, respectively. The cage member also has an axial bore 38 forming an interior face. The cage member is provided with an outer or first annulus of equidistantly spaced bearing bores 39 which, in the particular embodiment illustrated, are inclined radially outwardly from their lower ends to their upper ends and open through both the upper and lower faces 36 and 37 of the cage member.

The cage member also is formed with a second or inner annulus of bearing bores 40 equidistantly spaced about the center or axis of the cage member 34, and also being inclined radially outwardly from their lower ends to their upper ends and projecting through the upper and lower end faces of the cage member.

Each of the bearing bores 39 and 40 receives an elongate bearing member 41, circular in cross-section at its end portions and being freely rotatable within the bearing bores, it being noted that while the bearing members 41 are freely rotatable within the bearing bores they are closely fitted thereto as by lapping or grinding so at to have a minimum of side or lateral clearance and hence a minimal degree of lateral movement within the bearing bores, both to reduce wear as well as to prevent lateral tilting and relative misalining between the several bearing members. The bearing members 41 are of such a longitudinal or axial length as to extend through the end faces 36 and 37 of the cage member, each end face 42 of each bearing member being convex or spherical in configuration so as to provide end load-bearing faces equivalent to those typical of ball bearings of a diameter equal to twice the radius of curvature of the end faces 42. Again, for optimum results, the radius of curvature of the end faces 42 should be twice the axial lengths of the bearing members 41, but greater or lesser axial lengths may be employed with concomitant variation in the mechanical functioning of the bearing members as bearings.

A first shaft or thrust member 43 is formed with an elongate axial pin 44, of reduced diameter, having a loose or sliding fit within the axial bore 38 of the cage member 34 and provided with an annular, outwardly extending shoulder 45 surrounding the base of the pin 44 and receiving a circular washer or bearing disk 46 upon which the lower end faces 42 of the bearing members 41 engage. A similar bearing disk or washer 47 is received upon the upper end of the pin 44 and has an underside engaging the upper end faces 42 of the bearing members.

A second thrust member 48, which may or may not be tubular, is formed on its lower end with a depending, hollow, cylindrical box 49, the bottom 50 of which engages the upper face of the bearing disk 47, the bottom of the box having a reduced axial bore receiving a needle or pin bearing 51 encompassing a bearing bushing 52 having a press fit upon the upper extremity of the pin 44. A second needle or pin bearing 53 is received between the outer periphery of the first thrust member 43 and the interior of the lower portion of the box 49.

In function, the second form of the invention is in many respects substantially the same as that of the first described form, and the same remarks apply thereto. It is noted that the second modification makes provision for a greater number of the bearing members 41 within a given cross-sectional space, and it further being apparent that the concentric rows or annuli of the bearing members 41 may be increased or multiplied as may be found suitable or advantageous for the particular bearing problem at hand.

As previously noted, alternate ones of the bearing members 41 in the first or outer annulus may be inclined either inwardly or outwardly, alternatively or any other suitable fashion, and the same applies to the inner row of bearing members which, as shown in FIG. 7 are inclined radially in the same direction and to the same extent as those of the outer annulus. However, the bearing members in one annulus may be inclined in one direction and those in the other annulus in the opposite direction, as shown in FIG. 8, wherein the inner bearing members are indicated as being inclined at an angle equal and opposite to that of the angle of inclination of the outer bearing members.

Further, the bearing members of any of the modifications of the invention may be modified as shown in FIG. 8 to provide a constant bearing surfec. As is true with any bearing, the bearings of the present invention will wear through prolonged use, and as such wear occurs, the relative areas of the end bearing faces of the bearing members will tend to increase in size, thus altering the operating characteristics of the bearing, introducing additional friction factors and otherwise modifying the performance of the bearing. When it is desirable to maintain the bearing areas of the end bearing faces of the bearing members substantially uniform throughout the operating or useful life of the bearing, the bearing members, may, as noted, be modified in accordance with the modification of FIG. 8 of the drawings in which the cage member 54 is provided with the longitudinal inclined bearing bore 55 having rotatably mounted therein a bearing member 56, and being suitably disposed in the subject structure as within a surrounding member or element 57, an upper thrust member 58 and a lower thrust member 59. The bearing member 56 is elongate and generally cylindrical in configuration, although other configurations may readily be employed so long as the bearing member is rotatable within the bearing bore 55 and projects through the upper and lower end faces of the cage member 54. The end bearing faces of the bearing member 56 again have the spherical or convex configuration previously described with the exception that a cylindrical, axial, recess 60 is formed centrally of each of the bearing faces, extending an appreciable distance axially of the bearing member 56 so as to leave exposed of the end bearing faces essentially only a peripheral marginal portion 61 which forms an annular part of the outermost section or periphery of the end bearing faces, and constitutes the area of the bearing faces upon which the bearing loads or thrusts are applied. The walls of the recesses 60 are parallel to the outer walls of the bearing members 56, at least at the end portions thereof, and accordingly, narrow annuli 62 of constant cross-section are formed between the side walls of the recesses 60 and the outer walls of the bearing member 56. Thus, as the bearing faces 61 wear down, they remain constant in exposed area, providing a presumably constant rate of wear, but more importantly presenting a constant bearing area regardless of the degree of wear which may have occurred.

It is highly desirable to supplement this structure by providing upon the thrust members 58 and 59 annular bearing ribs 63 upon which the bearing faces 61 ride and which are also of a substantially constant cross-sectional area viewed in axial cross-section so that as the ribs 63 wear away, there will continue to be exposed a more or less constant bearing area for the bearing faces 61, and more importantly, there will be no requirement that the bearing faces 61 cut an ever larger groove in the thrust members 58 and 59 which would tend to increase the frictional and bearing load applied due to the wearing of the thrust elements or members 58 and 59 over larger or wider areas as the bearing areas 61 move thereinto.

It is also to be noted that the bearing member 56 of the modification of FIG. 8 is shown as inclined at an equal but opposite angle to the bearing member 41 of FIG. 7, illustrating the modification of tilting the bearing members either in one direction or the other as may be desired.

Yet another modification applicable to all forms of the invention is shown in FIG. 6 in which the spherical or convex end bearing faces 64 of the bearing members 65 are modified by having formed thereon a frusto-conical section 66 having its margins spaced from the periphery of the bearing member 65 as well as the central axis thereof, but being concentrically positioned with respect to the longitudinal axis of the bearing member 65, the latter, of course, being carried in the usual cage member 67, and the bearing member engaging a suitable thrust member 68.

This modification makes provision for increased areas of application of the bearing loads on the bearing end faces of the bearing members in that the load may be applied entirely across a radial line on the frusto-conical area 65 and areas adjacent thereto rather than the theoretical application of the bearing load to a single point and the immediately surrounding area as is the case with truly spherical ball bearings and the bearing members of this invention having spherical or convex end faces. It is noted, however, as set forth herein and as used in this description and the claims appended hereto, the words "generally convex" apply not only to end bearing faces representing sections of true spherical faces, but also, such faces modified with the frusto-conical section, as illustrated in the form of the invention shown in FIG. 6, as well as the form of the invention shown in FIG. 8 in which the convex or generally convex faces of the bearing members are modified by the shallow axial bores 60. The modification of FIG. 6 will withstand greater bearing loads than those of the other modifications, but it is also noted, that the truly spherical configurations of the previously described bearing members may, in the course of time, and as expected wear occurs, approach the configuration of that of FIG. 6. In addition, the thrust members upon which the end bearing faces of the bearing members ride or roll, will tend to develop circular bearing patterns or grooves conforming to the configuration of the end faces of the bearing members, so that the thrust members and the bearing members more or less wear into a close conformity and snug fit with respect to one another, and further, that the portions of the faces of the thrust members engaged by the end bearing faces of the bearing members may initially receive, or be formed with, circular grooves of various configurations to function much in the same manner as the races for a conventional ball bearing function.

Thus, the invention is subject to much modification, both of the end bearing faces of the bearing members and the faces of the thrust members which they engage, the degrees, directions and relative angularity of disposition of the several bearing members, the axial lengths of the bearing members, and the like. In all instances, however, the anti-friction bearing of this invention utilizes an elongate bearing member having generally convex end bearing faces of a radius of curvature somewhat greater or much greater than the transverse dimensions or transverse diameter of the bearing members, and utilizes a plurality of such bearing members to provide the full operative equivalent of conventional ball bearings of much greater radial or axial dimensions. Of course, the preferred application of the invention is to bearings in which axial loads are to be withstood, or in which, the primary function of the elongate bearing members is to withstand thrust loads as contrasted to radial loads. In other words, the invention is primarily applicable to bearing means for a shaft in which the bearing means withstands the endwise thrust of the shaft rather than the radial loads thereof.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. An anti-friction load-sustaining bearing including a plurality of elongated roller-shaped bearing members of circular cross-section having substantially spherical bearing load-sustaining end bearing faces on each end for carrying substantially the entire bearing load, the end faces having a general radius of curvature of the magnitude of one-half the axial length of the bearing members, the bearing members being of much greater length than diameter, a cage member for the bearing members of generally ring shape having end faces and an axial bore forming an internal face, the cage member having an outer longitudinal face and a plurality of bearing bores receiving the bearing members in rotatable relationship, the bearing bores being inclined at an oblique angle with respect to one axis of the cage member and opening through opposed faces of the cage member, the bearing bores having axial lengths less than the axial lengths of the bearing members.

2. An anti-friction load-sustaining bearing including a plurality of elongated roller-shaped bearing members of circular cross-section having convex bearing load-sustaining end bearing faces on each end for carrying substantially the entire bearing load, the end faces having a general radius of curvature of the magnitude of one-half the axial length of the bearing members, the bearing members being of much greater length than diameter, a cage member for the bearing members of generally ring shape having end faces and an axial bore and an outer longitudinal face, the cage members having a plurality of longitudinal bores receiving the bearing members in rotatable relationship, the longitudinal bores being radially inclined with respect to the longitudinal axis of the cage member and opening through the end faces of the cage member, the longitudinal bores having axial lengths less than the axial lengths of the bearing members.

3. An anti-friction load-sustaining bearing including a plurality of elongated roller-shaped bearing members of circular cross-section having convex bearing load-sustaining end bearing faces on each end for carrying substantially the entire bearing load, the end faces having a general radius of curvature of the magnitude of one-half the axial length of the bearing members, the bearing members being of much greater length than diameter, a cage member for the bearing members of generally ring shape having end faces and an axial bore forming an internal face, the cage member having an outer longitudinal face and a plurality of bearing bores receiving the bearing members in rotatable relationship, the bearing bores being inclined at an oblique angle with respect to one axis of the cage member and opening through opposed faces of the cage member, the bearing bores having axial lengths less than the axial lengths of the bearing members, the convex end bearing faces of the bearing members having frusto-conical bearing areas disposed concentrically thereon.

4. An anti-friction load-sustaining bearing including a plurality of elongated roller-shaped cylinder bearing members of circular cross-section having convex bearing load-sustaining end bearing faces on each end for carrying substantially the entire bearing load, the end faces having a general radius of curvature of the magnitude of one-half the axial length of the bearing members, the bearing members being of much greater length than diameter, a cage member for the bearing members of generally ring shape having end faces and an axial bore and an outer longitudinal face, the cage member having a plurality of longitudinal bores receiving the bearing members in rotatable relationship, the longitudinal bores being inclined with respect to the longitudinal axis of the cage member and opening through the end faces of the cage member, the longitudinal bores having axial lengths less than the axial lengths of the bearing members.

5. An anti-friction load-sustaining bearing including a cage member of generally cylindrical shape having end faces and an outer longitudinal face along with an axial bore forming an internal face, the cage member having a plurality of bearing bores surrounding its axial bore with their longitudinal axes inclined at an oblique angle with respect to one axis of the cage member, the bearing bores being equidistantly spaced circumferentially of the cage member and extending through opposed faces thereof, and an elongated roller-shaped bearing member of circular cross-section in each of the bearing bores and having convex bearing load-sustaining end bearing faces on each end for carrying substantially the entire bearing load, the end faces having a radius of curvature much greater than the transverse radius of the bearing members, the bearing members having axial lengths greater than the axial lengths of the bearing bores, the bearing members being of much greater length than diameter.

6. An anti-friction load-sustaining bearing including an integral cage member of generally cylindrical shape having end faces and an outer longitudinal face along with an axial bore forming an internal face, the cage member having a first set of a plurality of bearing bores surrounding its axial bore with their longitudinal axes inclined at an oblique angle with respect to one axis of the cage member, the bearing bores of the first set being equidistantly spaced circumferentially of the cage member and extending through opposed faces thereof, the cage member having a second set of a plurality of bearing bores surrounding its axial bore concentrically of the first set with their longitudinal axes inclined at an oblique angle with respect to one axis of the cage member, the bearing bores of the second set being equidistantly spaced circumferentially of the cage member and extending through opposed faces thereof, and an elongated roller-shaped bearing member of the circular cross-section in each of the bearing bores and having convex bearing load-sustaining end bearing faces on each end for carrying substantially the entire bearing load, the end faces having a radius of curvature much greater than the transverse radius of the bearing members, the bearing members having axial lengths greater than the axial lengths of the bearing bores, the bearing members being of much greater length than the diameter.

7. An anti-friction load-sustaining bearing as set forth in claim 6 wherein the bearing bores of both sets of bores are inclined in the same radial direction.

8. An anti-friction load-sustaining bearing as set forth in claim 6 wherein the bearing bores of each set of bores are inclined in opposite radial directions.

9. An anti-friction load-sustaining bearing as set forth in claim 5 and a first thrust member encompassing the cage member, the first thrust member having a face adapted to transfer thrust to one end of the bearing members, and a second thrust member received within the axial bore of the cage member and having a face adapted to transfer thrust to the other end of the bearing members, one thrust member being rotatable with respect to the other thrust member.

10. An anti-friction load-sustaining bearings as set forth in claim 5 and a first thrust member having a box encompassing the cage member, the box having a bottom adapted to transfer thrust to one end of the bearing members, and a second thrust member having a pin received within the axial bore of the cage member and a shoulder surrounding the pin adapted to transfer thrust to the other end of the bearing members, one thrust member being rotatable with respect to the other thrust member, and lateral-thrust friction members between the two thrust members.

11. An anti-friction load-sustaining bearing as set forth in claim 5 wherein the convex end bearing faces of the bearing members have frusto-conical bearing areas disposed concentrically thereon.

12. An anti-friction load-sustaining bearing including an integral cage member of generally cylindrical shape having end faces and an axial bore along with an outer longitudinal face, the cage member having a first set of a plurality of bearing bores surrounding its axial bore with their longitudinal axes inclined radially with respect to the longitudinal axis of the cage member, the bearing bores of the first set being equidistantly spaced circumferentially of the cage member and extending through its end faces, the cage member having a second set of a plurality of bearing bores surrounding its axial bore concentrically of the first set with their longitudinal axes inclined radially with respect to the longitudinal axis of the cage member, the bearing bores of the second set being equidistantly spaced circumferentially of the cage member and extending through its end faces, and an elongated roller-shaped bearing member of circular cross-section in each of the bearing bores and having convex bearing load-sustaining end bearing faces on each end for carrying substantially the entire bearing load, the end faces having a radius of curvature much greater than the transverse radius of the bearing members, the bearing members having axial lengths greater than the axial lengths of the bearing bores, the bearing members being of much greater length than diameter.

13. An anti-friction load-sustaining bearing as set forth in claim 5 wherein the bearing members have axial circular recesses in their end bearing faces.

14. An anti-friction load-sustaining bearing as set forth in claim 5 and a first thrust member encompassing the cage member, the first thrust member having a face adapted to transfer thrust to one end of the bearing members, and a second thrust member received within the axial bore of the cage member and having a face adapted to transfer thrust to the other end of the bearing members, one thrust member being rotatable with respect to the other thrust member, the bearing members having axial circular recesses in their end bearing faces, and the thrust members having annular bearing ribs engaged by the end bearing faces of the bearing members.

References Cited by the Examiner
UNITED STATES PATENTS

| | | | |
|---|---|---|---|
| 525,404 | 9/94 | Carman | 308—229 X |
| 663,435 | 12/00 | Heath | 308—215 X |
| 1,840,607 | 1/32 | Scribner | 308—218 |
| 2,174,325 | 9/39 | Large | 308—235 X |
| 2,430,359 | 11/47 | Messinger | 308—174 X |
| 2,785,934 | 3/57 | Alderstam | 308—235 X |

ROBERT C. RIORDON, *Primary Examiner.*